Feb. 25, 1958 F. E. PARISI 2,825,031
METHOD OF CONVERTING MODES OF WAVE MOTION FOR TRANSMISSION
FROM RECTANGULAR TO CIRCULAR WAVE GUIDES
Filed Dec. 15, 1951 3 Sheets-Sheet 1

INVENTOR.
FRANK E. PARISI

Feb. 25, 1958 F. E. PARISI 2,825,031
METHOD OF CONVERTING MODES OF WAVE MOTION FOR TRANSMISSION
FROM RECTANGULAR TO CIRCULAR WAVE GUIDES
Filed Dec. 15, 1951 3 Sheets-Sheet 2
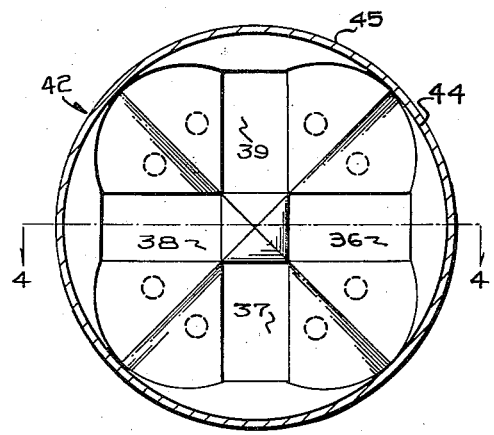
FIG. 3
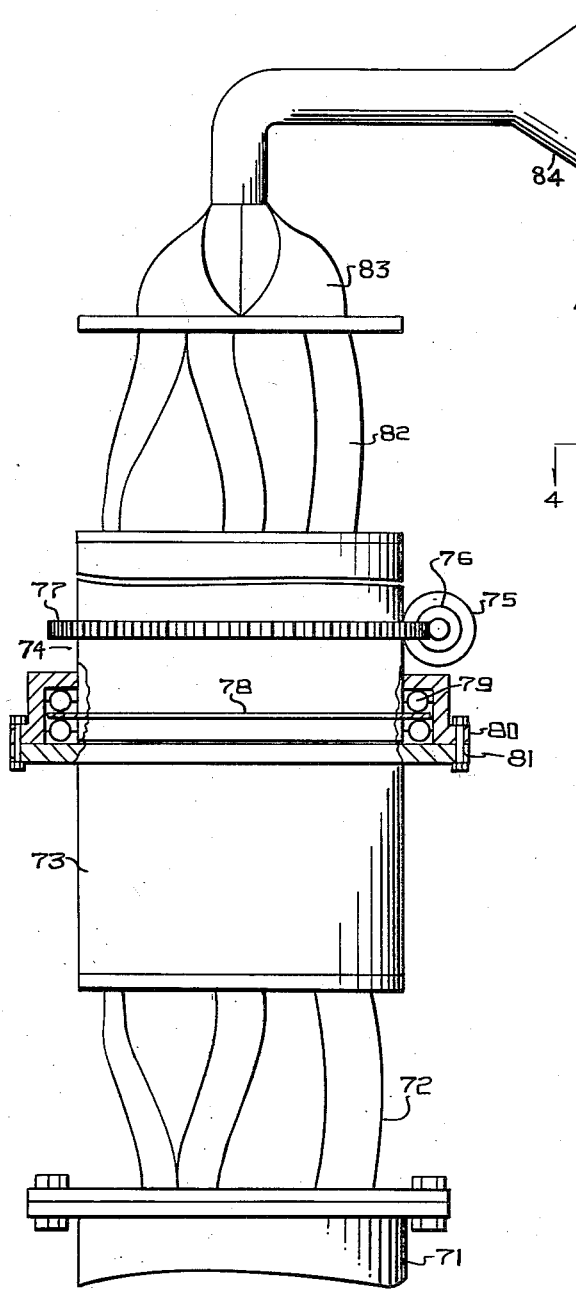
FIG. 2
FIG. 4
INVENTOR.
FRANK E. PARISI
By Ezekiel Wolf
his attorney Feb. 25, 1958 F. E. PARISI 2,825,031
METHOD OF CONVERTING MODES OF WAVE MOTION FOR TRANSMISSION
FROM RECTANGULAR TO CIRCULAR WAVE GUIDES
Filed Dec. 15, 1951 3 Sheets-Sheet 3

INVENTOR.
FRANK E. PARISI
By Ezekiel Wolf
his Attorney

United States Patent Office 2,825,031
Patented Feb. 25, 1958

2,825,031

METHOD OF CONVERTING MODES OF WAVE MOTION FOR TRANSMISSION FROM RECTANGULAR TO CIRCULAR WAVE GUIDES

Frank E. Parisi, Waban, Mass., assignor to Andrew Alford, Boston, Mass.

Application December 15, 1951, Serial No. 261,882

4 Claims. (Cl. 333—21)

The present invention relates to a method and means of creating certain modes of wave motion in circular wave guides and in particular relates to the creation of $TE_{0,1}$ in circular wave guides. Notations here used are the same as in Electromagnetic Waves, by S. A. Schelkunoff; published by Van Nostrand Co., Inc., 1943, p. 395. While energy is transmitted between wave guides which may be rotated relative to each other about a common axis, it is necessary to maintain circular symmetry in the wave guide, that is the electric and magnetic fields should be constant in magnitude and phase and in the same radial or tangential direction at any point of a circle whose center is on the axis of rotation and which is in a plane normal to this axis. This condition is needed to maintain constant power through the joint during rotation and constant impedance presented to the source. In order to accomplish this result, a tube having a circular symmetry, namely a cylindrical tube, should be used on which is impressed a wave having a mode of propagation which possesses this symmetry.

The present invention more particularly relates to the method and means for producing a wave which has such a mode of propagation. The applicant has discovered that such a mode of propagation may be provided by using four rectangular wave guides arranged in a cross each equally excited in a $TE_{1,0}$ mode and then having such wave guides connected to the cylindrical tubing in such a way that the electric field is directed in the same tangential direction to concentric circles normal to the axis of the tube. If desired the walls of the rectangular guide may be tapered outward to make a gradual transition with the circular tube, but it will be found that good results are also obtained without such tapering sections.

The rectangular cross guide mentioned above with the electrical field arranged in the proper direction may be obtained from a wave guide having a $TE_{2,0}$ mode and this is probably the simplest manner in which the circular field of symmetry may be created.

The method and means of providing the desired mode of propagation will be more fully understood from a description in the specification set forth below when taken in connection with the drawings illustrating the same, in which:

Figure 3 shows a plan view of a section fitting over the section of Figure 1.

Figure 4 shows a section taken on the line 4—4 of Figure 3.

Figure 5:
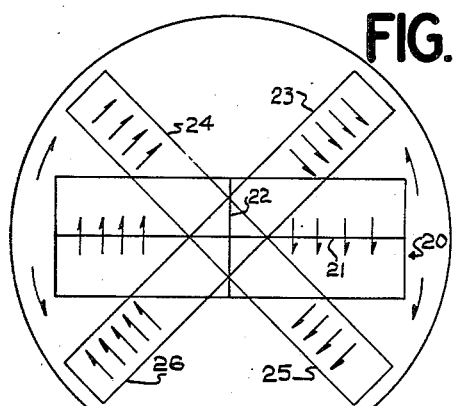
Figure 5 shows diagrammatically the steps in going from the one mode of propagation to the other.
Figure 6:
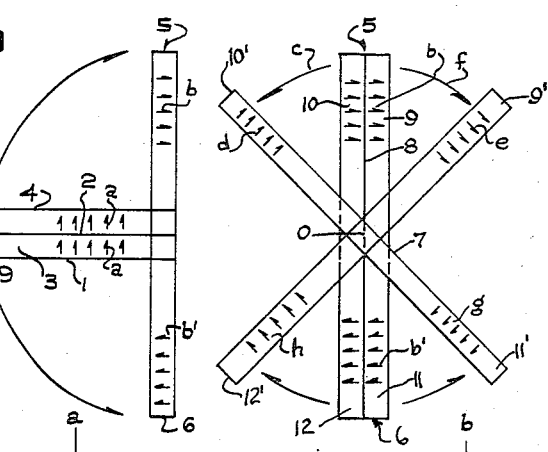
Figure 6 shows diagrammatically an arrangement for establishing the modes shown in Figure 5, and, Figure 7 shows in detail a further converting section which may be employed in the present invention, and, Figure 8 shows an arrangement for rotating a directive element.

Referring to the diagrams of Figures 5 and 6, more particularly to Figure 6, 1 shows a wave guide having a mode of propagation $TE_{1,0}$ in which the arrows $a$, indicate the direction of the electric field. A central conductive partition 2 parallel to the long side of the guide 1 will not affect the field pattern, so that in effect the wave guide 1 is thereby split up into two wave guides 3 and 4 both having $TE_{1,0}$ modes of vibration.

By curving the wave guide 4 to the position of the guide 5 and the wave guide 3 to the position of the wave guide 6 and joining these two guides as a single guide, a wave guide is produced which has a $TE_{2,0}$ mode.

It will be noted that in such a wave guide the E vector in one half of the guide is in the opposite direction from that in the other half of the guide as indicated by the arrows $b$, $b'$.

At the central plane of the guide 5, 6, a partition 7 may be inserted across the guide without affecting the directions of the electrical potentials, since in this median plane, the potential is zero. A lengthwise partition may also be inserted running centrally for the length of the guide also without disturbing the pattern, since the electric lines of force are perpendicular to this conductive partition. There are thereby formed, four individual wave guides, 9, 10, 11 and 12, each having a $TE_{1,0}$ mode with one set 9 and 10 having the electric field running transversely of the guides in the same direction, but opposite to that of the electric field in the other pair of guides 11 and 12. By twisting each of these guides to a position where the long axis of each guide is 45° from its adjacent guide, the desired pattern having an approximate circular symmetry is obtained.

In the arrangement of Figure 6, the guide 10 has a 45° twist to bring it to a position 10'. This twist is in the direction of the arrow $c$. The electric field as indicated by the arrow $d$ will be tangential to circles in a normal plane about the axis of the circular guide which is coincident with the center point O. Similarly the guide 9 is twisted to a position 9' and the arrows $e$ are also tangential to the same circle as the arrows $d$ and in the same clockwise direction. The twist from 9 to 9' is in the direction of the arrow $f$ and is 45°. In similar fashion the wave guides 11 and 12 are twisted to have their other ends in the position 11' and 12' respectively, and in this case the arrows $g$ and $h$ are in the same clockwise directions as the arrows $d$ and $e$. The positions of the ends of the four guides 9', 10', 11' and 12', have the figure of a cross which should preferably be at angles of 90° from each other. The guides need not maintain the same length and width dimensions through the twist.

As indicated in Figure 6, the end of the guide 5 is tapered to a larger width dimension than that of the guide 4. Similarly the end of the guides 9' and 16' may be tapered to larger width dimensions than the ends 9 and 10. This tapering should be gradual and the laws relative to dimensions of the wave guide should be observed. For a $TE_{1,0}$ mode in rectangular wave guides the longest transverse dimension of the tube must be greater than $\lambda/2$ where $\lambda$ is the longest wave length of the band to be transmitted, but this dimension preferably should not be greater than $\lambda$ for if that occurs it is possible to excite the $TE_{2,0}$ mode of vibration which is that shown in the vertical wave guide of Figure 6, namely the combination of the two guides 5 and 6.

While the wave guides in Figure 6 have been shown as rectangular in shape, this exact shape of guide need not be maintained and transitional gradual changes may be made and different forms may be used as long as the same mode of wave propagation is maintained. In the transition from the rectangular cross guide to the circular guide, the side walls of the rectangles may be tapered gradually to increase the guide opening to the cylindrical form as will be more fully described in connection with the drawings of Figures 3 and 4.

Figure 1:
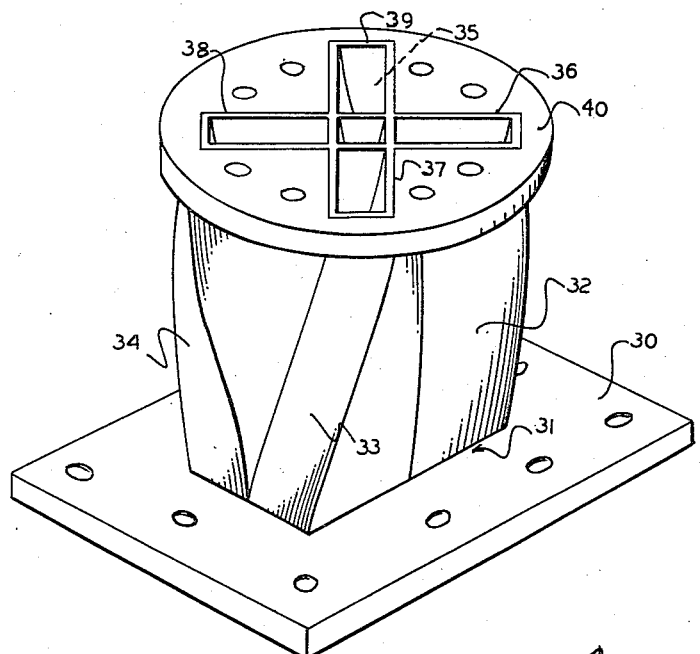
Figure 1 shows in perspective a section of a wave guide for converting a $TE_{2,0}$ mode into one having axial symmetry.
Figure 2:
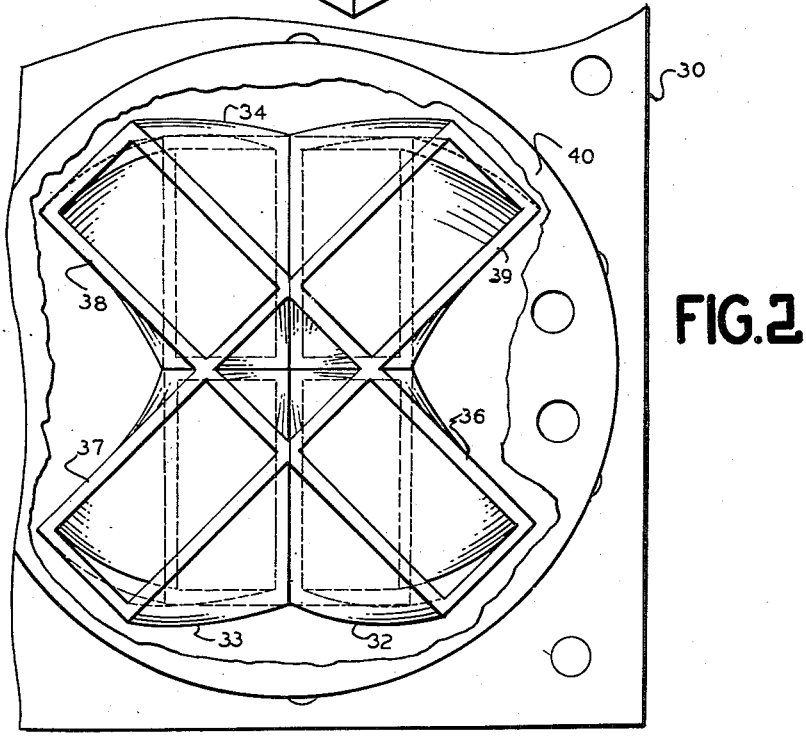
Figure 2 shows a broken away view as viewed from the top of Figure 1.

The arrangement shown in Figure 5 shows the transition of a wave guide with a $TE_{2,0}$ mode to a cross rectangular mode for presenting a circular field. In this arrangement the wave guide 20 is made to pass such a mode by making the transverse long dimension of the guide greater than the wave length $\lambda$ where $\lambda$ is defined as above set forth. In this case the partitions 21 and 22 may be inserted in the guide cross-wise as indicated without disturbing the wave form of the guide as a whole, but it will be observed that such partitions convert the guide into four wave guides, each with a $TE_{1,0}$ mode as described in Figure 6. It is only necessary therefore to produce the rectangular cross guide having the proper wave motion to rotate the individual guides to 45° positions as indicated by the dotted line elements 23, 24, 25 and 26. It will be noted that the directions of the arrows denoting the E vectors are in the same direction of rotation, namely, clockwise. In this case the magnetic field is in a radial direction with respect to the axis of the guide and the propagation is in the direction of the axis of the guide. Where a $TM_{0,1}$ mode is used, the magnetic and electrical lines are interchanged with the same resulting type of propagation. The actual form of structure producing the propagation modes as set forth in Figures 5 and 6 is shown in Figures 1 and 2.

Referring more specifically to these figures, 30 is a flange plate which has an opening in its bottom face, not shown, in which a wave guide 31 is secured. This wave guide 31 is of the form shown in Figure 5 at 20, with the $TE_{2,0}$ mode. The wave guide is provided with two right angled partitions which divides the guide into four sections, 32, 33, 34 and 35. At the back of the plate 30, these sections emerge as individual wave guides, each having a propagating mode corresponding respectively to the individual guides of Figure 5, namely, sections 23, 24, 25 and 26. The guides 32, 33, 34 and 35, are twisted or spiralled gradually over a section which preferably should be substantially two wave lengths within the frequency range propagated to produce at the output end, a cross form as indicated by the openings 36, 37, 38 and 39. These ends 36, 37, 38 and 39, corresponding to the guides 32, 33, 34 and 35, may terminate in conductive flange plate 40 over which the section 42, Figures 3 and 4, may be placed expanding the cross openings to a cylindrical wave guide. This combination will produce the necessary circular symmetry so that a tube may be mounted for rotation about its axis to produce a radiation which may be rotated around its whole 360° as indicated more specifically in Figure 8.

Any of the standard means usually employed for rotating antennas may be used, such for instance as a horn or a reflecting element or a directive array or loop.

The invention in the present case is more particularly concerned with the production of the desired propagational mode.

It has been found that the rectangular cross as provided in Figure 1 may have its input directly into a circular wave guide and there is no necessity that the two guides be conductively connected together.

The section shown in Figures 3 and 4 may be mounted on top of the flange 40. In this case the openings as for instance 36 and 38 may be expanded with gradually expanding central and outward sections 43 and 44 respectively in smooth continuous surfaces to the inner wall 45 of the cylindrical tubing. Each one of the four rectangular openings should be expanded in the same way. The section 42 may be held to the flange 40 by suitable screws 46, but it is not necessary that conductive contact need be maintained although there is no objection to this.

The section 43 is interconnected at its lower corners by suitable means to adjacent lower portions of the casing forming the openings 36, 37, 38 and 39.

Figure 7:
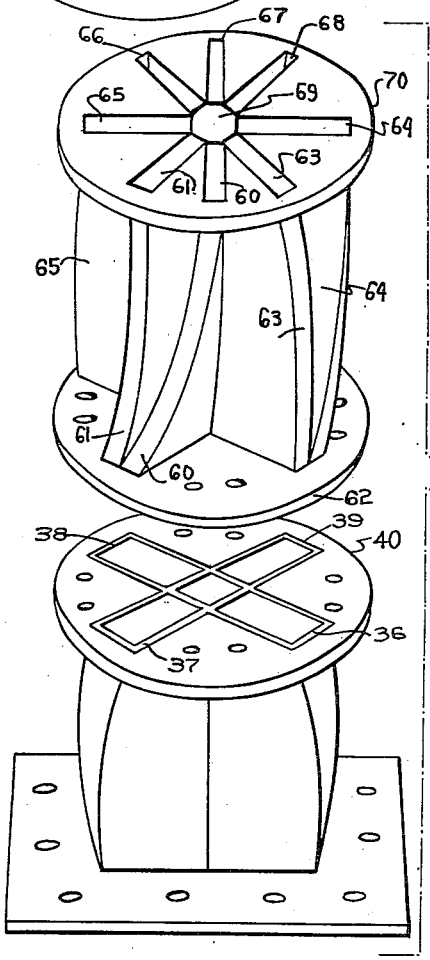

In the arrangement indicated in Figure 7, the guides emerging in a cross as indicated in Figure 1, are further divided as indicated in the upper section of the figure. Here the guide end 37 corresponding to the same numerals in Figure 1, is split by a center partition going lengthwise of the guide and formed into two separate guides 60 and 61, emerging from the retaining plate or flange 62 which is normally joined in face to face contact with the plate 40 of the lower section shown in Figure 7. Similarly each of the ends 36, 38 and 39 of the wave guides are split to form separate guides 63, 64 for the guide 36; 65, 66 for the guide 38, and 67, 68 for the guide 39. These split guides form a regular symmetrical pattern of eight guides each radially spaced in their longitudinal axes of 45° forming a center octagonal polygon opening as indicated at 69 in the top disc or flange 70 in which the guides are secured. The fields emerging from these guides have their electrical components all rotated in the same direction forming a substantially circular rotation pattern of a $TE_{0,1}$ mode of propagation.

The wave emerging from the upper section of Figure 7 is more preferable than that emerging from the lower section because adjacent electric components are now at an angle of 45° as they emerge from the wave guide rather than at an angle of 90° as is the case in the lower section of Figure 7. This provides a considerable improvement in the propagational mode entering the circular wave guide and smooths out the form of such an extent that a substantially circular pattern is obtained.

In the arrangement indicated in Figure 8, there is shown a means by which directional rotation of a radiant source may be obtained by means of the present invention.

Referring more particularly to Figure 8, a wave guide 71 which may be similar to the input member in Figure 1 as far as the mode of propagation is concerned, is connected with an element 72 corresponding to the element shown in Figure 1 which converts the wave motion from the rectangular guide to a circular guide 73 which forms a continuation of the conversion section 72. The section 72 may correspond to that shown in Figure 1 or it may be a combination of the two units shown in Figure 7. The circular wave guide 73 should be properly dimensioned so that it will pass the desired frequency, namely, the diameter of the guide should substantially be equal to or greater than $1.22\lambda$ where $\lambda$ is the wave length of the cut off frequency. The circular section 73 may carry a rotating circular section 74 mounted on top of it.

Figure 8 shows a conventional drive including a motor 75, a worm or gear 76 and a ring gear 77 mounted on the outside of the rotating cylindrical guide 74. The cylindrical guide 74 may be provided with a ring bearing 78 which is supported in ball bearing races 79 held in place by the bearing ring element 80 secured to the flange 81 of the fixed cylindrical wave guide 73.

At the top of the circular guide 74, a reverse converting element 82 is placed which will convert the circular mode received from the cylinder 74 eventually into a mode suitable for the rectangular guide 83 from which the wave may be conveyed to a radiating horn 84 or other radiating element such as a reflector or other unit.

It will be evident from the arrangement in Figure 8 that the horn may be rotated around complete 360° without disturbing the wave propagation in the system.

The arrangement which has been described in connection with Figure 8 is only one of the many forms to which the conversion and reconversion from rectangular guides to circular or cylindrical guides are usefully applied.

Wherever it is desired to rotate a section of the wave guide with respect to another section of the wave guide, this cannot be efficiently accomplished except by means as generally set forth in the present invention.

Having now described my invention, I claim:

1. An apparatus for producing a $TE_{0,1}$ mode of propagation in a circular wave guide comprising two sections, said first section having four rectangular wave guides, each having propagational modes of $TE_{1,0}$ having gradual spiral twists into positions forming a pattern of a uniform cross with a square center formed of the short sides of the wave guides, said second section fitting to said first section and having a central conductive core element fitting over said square and tapering to a point in axial alignment with the center of symmetry of said pattern and wall elements tapering outwardly from the sides of the rectangular wave guides to diagonal planes coinciding with the diagonals of said square and from the outer ends and sides of the rectangular guides to cylindrical walls coaxial with said center of symmetry and said cylindrical wall elements.

2. An apparatus for producing a $TE_{0,1}$ mode of propagation in a circular wave guide, comprising two sections, said first section having four rectangular wave guides, each having propagational modes of $TE_{1,0}$ having gradual spiral twists into positions forming a pattern of a uniform cross with a square center formed of the short sides of the rectangular wave guides, a second section having a central conductive core element fitting over said square center and tapering to a point in axial alignment with the center of symmetry of said cross pattern, and having a cylindrical wall at one end and having at its other end surrounding said core, a pattern fitting said uniform cross pattern, conductive means extending inwardly in said second section from the end having said uniform cross providing conductive members tapering to diagonal planes coinciding with the diagonals of said cross and other conductive wall elements tapering outward to said cylindrical wall.

3. An apparatus for producing a $TE_{0,1}$ mode of propagation in a circular wave guide comprising four rectangular wave guides, each having progational modes of $TE_{1,0}$ said wave guides forming a section with four guides twisted from a rectangular position into a cross pattern, each said guide in said rectangular position being symmetrical about a center axis and equally spaced therefrom with the electric vectors having the same angular direction of rotation, a second wave guide section mounted on the cross pattern end of said first section, said second section having cylindrical conductive walls with a center conductive section tapering to a point coaxial with the cylinder from the inner adjacent sides of the four rectangular guides and with partitioning sections formed with sides of the guides at right angles to each other tapering to diagonal lines across the cylinder.

4. An apparatus for producing a $TE_{0,1}$ mode of propagation in a circular waveguide comprising two sections, said first section having an even numbered plurality of at least four rectangular waveguides, each having propagational modes of $TE_{1,0}$ having gradual spiral twists into positions forming a uniform equiangular pattern with a regular polygon center formed of the short sides of the waveguides, said second section fitting to said first section and having a central conductive core element fitting over said polygon and tapering to a point in axial alignment with the center of symmetry of said pattern and wall elements tapering outwardly from the sides of the rectangular waveguides to diagonal planes coinciding with the diagonals of said polygon and from the outer ends and sides of the rectangular guides to cylindrical walls coaxial with said center of symmetry and said cylindrical wall elements.

References Cited in the file of this patent

UNITED STATES PATENTS

| | | |
|---|---|---|
| 2,439,285 | Clapp | Apr. 6, 1948 |
| 2,455,158 | Bradley | Nov. 30, 1948 |
| 2,534,876 | Ortusi | Dec. 19, 1950 |
| 2,543,188 | Moseley | Feb. 27, 1951 |
| 2,584,399 | Preston | Feb. 5, 1952 |